2,861,087

17α-METHYL-ANDROSTANE 3,11β,17β-TRIOL COMPOUNDS

Milton E. Herr, Kalamazoo, Mich., assignor to The Upjohn Company, Kalamazoo, Mich., a corporation of Michigan No Drawing. Application December 5, 1955
Serial No. 550,809

5 Claims. (Cl. 260—397.5)

This invention pertains to organic compounds of the androstane series and is more particularly concerned with novel 17α-methylandrostane-3,11β,17β-triols of the formula

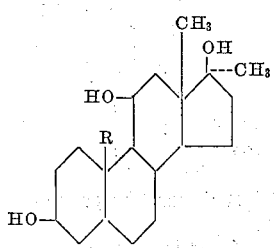

wherein R is selected from hydrogen and methyl. It is to be understood that the configuration of the 3-hydroxy group and the 5-hydrogen atom each can be α or β, and that compounds having both forms of the 3-hydroxy group and the 5-hydrogen atom are included within the scope of the present invention.

It is an object of this invention to provide the 17α-methylandrostane-3,11β,17β-triols of the above formula. Said compounds are potent anabolic and androgenic agents and can be used in place of prior anabolic and androgenic agents in known anabolic and androgenic pharmaceutical preparations. The compounds also have hypotensive, anti-pituitary, and central nervous system depressant activity, and can be employed in place of known agents in pharmaceutical formulations used for such purposes. Other objects and uses will be apparent to one skilled in the art.

The 17α-methylandrostane-3,11β,17β-triols of the above formula are also useful in the form of their 17-monoacylate, 3,17-diacylate, 11,17-diacylate or 3,11,17-triacylate. Their acylates, e. g., mono-, di-, or tri-acetate, propionate, trimethylacetate, α or β-cyclopentylpropionate, α or β-cyclohexylpropionate, benzoate, phenylacetate, cyclohexylacetate, α or β-phenylpropionate, or other hydrocarbon carboxylate, preferably containing from one to nine carbon atoms, inclusive, are useful for the same purposes as the parent compounds, and in addition these esters are useful for the purification of the parent 17α-methylandrostane-3,11β,17β-triols.

The 17α-methylandrostane-3,11β,17β-triols of the present invention can be prepared readily from the corresponding 11β,17β - dihydroxy - 17α - methylandrostane-3-ones (starting compounds are described in copending application Serial No. 550,845, filed December 5, 1955, now U. S. Patent 2,842,570) by hydrogenation of the 3-keto group to a 3-hydroxy group. The hydrogenation can be carried out by chemical reduction procedure, e. g., using a chemical reducing agent such as sodium borohydride (preferred), potassium borohydride, lithium aluminum hydride, or other bimetallic hydride, sodium and alcohol, etc. in a solvent which does not react readily with the reducing agent. The hydrogenation can also be carried out catalytically, e. g. employing hydrogen and a platinum catalyst employing an inert solvent such as ethyl alcohol. The 17α-alkylandrostane-3,11β,17β-triols and 17α-alkyl-19-norandrostane-3,11β,17β-triols wherein the alkyl radical is preferably a lower-alkyl radical containing from two to eight carbon atoms, inclusive, e. g., ethyl (particularly preferred), propyl, isopropyl, butyl, secondary-butyl, amyl, hexyl, heptyl, octyl, etc., are prepared by the same methods and have similar androgenic, anabolic, hypotensive, anti-pituitary, and central nervous system depressant activity.

The following examples are illustrative of certain preferred products and processes and are not to be construed as limiting.

*Example 1.*—A suspension of 0.379 gram of 11β,17β-dihydroxy-17α-methyl-5α-androstane-3-one in ten milliliters of 95 percent ethyl alcohol is stirred with a solution of 200 milligrams of sodium borohydride in two milliliters of one-tenth normal aqueous sodium hydroxide solution. The starting steroid dissolves almost immediately, and after ten minutes stirring the mixture is diluted with water and dilute aqueous acetic acid is added to raise the pH of the mixture to pH 6. The product which precipitates is removed by filtration, washed with water, and dried in vacuo to provide 0.35 gram of 17α-methyl-5α-androstane-3β,11β,17β-triol melting at 252–254 degrees centigrade. Recrystallization from methylene chloride gave a melting point of 258–260 degrees centigrade, $[\alpha]_D^{24}$ of plus sixteen degrees in chloroform.

*Analysis.*—Calcd. for $C_{20}H_{34}O_3$: C, 74.48; H, 10.63. Found: C, 74.73; H, 10.34.

*Example 2.*—11β,17β-dihydroxy-17α-methyl-5β-androstane-3-one is converted to 17α-methyl-5β-androstane-3α,11β,17β-triol following the hydrogenation procedure of Example 1. Recrystallization of the product from methylene chloride and normal hexanes (Skellysolve B), provides crystallization compound melting at 120 to 121 degrees centigrade.

*Example 3.*—Following the same hydrogenation procedure as shown in Example 1, 11β,17β-dihydroxy-17α-methyl-19-nor-5α-androstane-3-one is converted to 17α-methyl-19-nor-5α-androstane-3β,11β,17β-triol and 11β,17β-dihydroxy-17α-methyl-19-nor-5β-androstane-3-one is converted to 17α-methyl-19-nor-5β-androstane-3α,11β,17β-triol. Other 17α-alkyl-5α(and 5β)-androstane-3β(and 3α),11β,17β-triols and 17α-alkyl-19-nor-5α(and 5β)-androstane-3β(and 3α),11β,17β-triols, wherein the alkyl radical is as defined and illustrated above, are prepared by the same procedure from corresponding 11β,17β-dihydroxy-17α-alkyl-5α(and 5β)-androstane-3-ones and 11β,17β-dihydroxy-17α-alkyl-19-nor-5α(and 5β)-androstane-3-ones.

*Example 4.*—A solution of 17α-methyl-5α-androstane-3β,11β,17β-triol in dry pyridine is treated with acetic anhydride, the molar ratio of steroid to acetic anhydride being about two to four, and the resulting mixture is heated under reflux for about five hours. The mixture is then cooled, diluted with water while stirring, and the solid precipitate obtained removed by filtration. The solid is washed with two percent aqueous hydrochloric acid solution and with water, and then dried under vacuum. Recrystallization or chromatographic separation provides purified 17α-methyl-5α-androstane-3β,11β,17β-triol 3,17-diacetate. In exactly the same manner 17α-methyl-5β-androstane-3α,11β,17β-triol 3,17-diacetate, 17α-methyl-19-nor-5α-androstane-3β,11β,17β-triol 3,17-diacetate and 17α-methyl-19-nor-5β-androstane-3α,11β,17β-triol 3,17-diacetate are obtained by using 17α-methyl-5β-androstane-3α,11β,17β-triol, 17α-methyl-19-nor-5α-androstane-3β,11β,17β-triol and 17α-methyl-19-nor-5β-androstane-3α,11β,17β-triol, respectively, as the starting steroid in the foregoing procedure. Substituting the appropriate acylating agent, i. e., the appropriate acid, acid anhydride or acid chloride, for the acetic anhydride in the above process provides other 3,17-diacylates of 17α-methyl-5α(and 5β)-androstane-3β(and 3α),11β,17β-triol and 17α-methyl-19-nor-5α(and 5β)-androstane-3β(and 3α),11β,17β-triol including the 3,17-diformate, dipropionate, di-(trimethylacetate), difuroate, di-(α or β-cyclohexylpropionate), dibenzoate, di-(phenylacetate), di-(α or β-cyclopentylpropionate), di-(α or β-phenylpropionate), di-(methylbenzoate), di-(α or β-furylacrylate), divalerate, dimethacrylate, and the like.

*Example 5.*—A mixture of 17α-methyl-5α-androstane-3β,11β,17β-triol 3,17-diacetate, a large excess of acetic anhydride to serve as both acylating agent and solvent, and a trace of the strongly acidic catalyst sulfuric acid is heated at a temperature of about one hundred degrees centigrade for twelve hours. The hot solution then is poured over cracked ice and the resulting mixture stirred until hydrolysis of the excess acetic anhydride is complete. The solid product which precipitates is removed by filtration, washed with water and dried under vacuum. Purified 17α-methyl-5α-androstane-3β,11β,17β-triol 3,11,17-triacetate is obtained by recrystallization or chromatographic separation. 17α-methyl-5β-androstane-3α,11β,17β-triol 3,11,17-triacetate is obtained in exactly the same manner by substituting 17α-methyl-5β-androstane-3α,11β,17β-triol for the above starting steroid. By substituting the appropriate acylating agent, i. e., the appropriate acid anhydride or isopropenyl acylate, in the above procedure other 3,11,17-triacylates of 17α-methyl-5α(and 5β)-androstane-3β(and 3α),11β,17β-triol and 17α-methyl-19-nor-5α(and 5β)-androstane-3β(and 3α),11β,17β-triol are obtained including the 3,11,17-tripropionate, tri-(trimethylacetate), trifuroate, tri-(α or β-cyclohexylpropionate), tribenzoate, tri-(phenylacetate), tri-(α or β-cyclopentylpropionate), tri-(α or β-phenylpropionate), tri-(methylbenzoates), tri-(α or β-furylacrylates), trivalerate, tri-(methacrylate), 11-acetate 3,17-diformate, 11-(β-cyclopentylpropionate) 3,17-diacetate, and the like. The foregoing 3,17-diacylates and 3,11,17-triacylates, and also 17-monoacylates and 11,17-diacylates as well as other 3,17-diacylates and other 3,11,17-triacylates, can be prepared by hydrogenation, according to the process of the present invention, of corresponding 17-acylates and 11,17-diacylates of 11β,17β-dihydroxy-17α-methyl-5α(and 5β)-androstane-3-one and 11β,17β-dihydroxy-17α-methyl-19-nor-5α (and 5β)-androstane-3-one, followed by acylation according to the procedure of Examples 4 and/or 5, when applicable, to obtain the desired acylated product. The 17-monoacylates, 3,17-diacylates, 11,17-diacylates and 3,11,17-triacylates of other 17α-alkyl-5α(and 5β)-androstane-3 (and 3α),11β,17β-triols and 17α-alkyl-19-nor-5α(and 5β)-androstane-3β(and 3α),11β,17β-triols, wherein the alkyl and acylate radicals are as defined and illustrated above, also are prepared by the foregoing procedures.

It is to be understood that the invention is not to be limited to the exact details of operation or specific compounds shown and described herein, as obvious modifications and equivalents will be apparent to one skilled in the art; the invention is therefore to be limited only by the scope of the appended claims.

I claim:
1. 17α-methylandrostane-3,11β,17β-triol of the formula

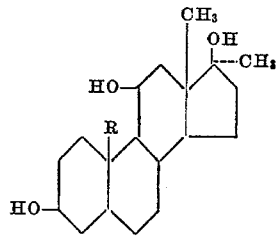

wherein R is selected from the group consisting of hydrogen and methyl.
2. 17α-methyl-5α-androstane-3β,11β,17β-triol.
3. 17α-methyl-5β-androstane-3α,11β,17β-triol.
4. 17α-methyl-19-nor-5α-androstane-3β,11β,17β-triol.
5. 17α-methyl-19-nor-5β-androstane-3α,11β,17β-triol.

References Cited in the file of this patent

UNITED STATES PATENTS 2,781,369     Oliveto _____ Feb. 12, 1957

OTHER REFERENCES

Metabolism of Steroid Hormones, by Dorfman and F. Ungar, Burgess Publishing Co., November 11, 1953; page 78.